(12) United States Patent
Deng et al.

(10) Patent No.: US 9,744,742 B2
(45) Date of Patent: Aug. 29, 2017

(54) THERMOSENSITIVE LABEL AND METHODS OF PREPARING AND USING THE THERMOSENSITIVE LABEL

(71) Applicant: SUZHOU HUASHI MATERIAL TECHNOLOGIES CO., LTD, Jiangsu (CN)

(72) Inventors: Zongwu Deng, Jiangsu (CN); Xiaofang Ying, Jiangsu (CN); Xiaoju Shi, Jiangsu (CN)

(73) Assignee: Suzhou Qualimark Technology Co., Ltd., Suzhou, Jiangsu (CN)

( * ) Notice: Subject to any disclaimer, the term of this patent is extended or adjusted under 35 U.S.C. 154(b) by 108 days.

(21) Appl. No.: 14/651,077

(22) PCT Filed: Dec. 16, 2013

(86) PCT No.: PCT/CN2013/089507
§ 371 (c)(1),
(2) Date: Jun. 10, 2015

(87) PCT Pub. No.: WO2014/101679
PCT Pub. Date: Jul. 3, 2014

(65) Prior Publication Data
US 2016/0297175 A1    Oct. 13, 2016

(30) Foreign Application Priority Data
Dec. 24, 2012   (CN) .......................... 2012 1 0567490

(51) Int. Cl.
*B32B 7/06*   (2006.01)
*B32B 7/12*   (2006.01)
(Continued)

(52) U.S. Cl.
CPC ................. *B32B 7/06* (2013.01); *B32B 7/12* (2013.01); *B32B 27/10* (2013.01); *B32B 27/20* (2013.01);
(Continued)

(58) Field of Classification Search
None
See application file for complete search history.

(56) References Cited

U.S. PATENT DOCUMENTS

| 5,053,339 A | 10/1991 | Patel |
| 2005/0181946 A1 | 8/2005 | Tani |
| 2007/0140068 A1 | 6/2007 | Teffenhart et al. |

FOREIGN PATENT DOCUMENTS

| CN | 101665677 | 3/2010 |
| CN | 201788626 | 4/2011 |

(Continued)

OTHER PUBLICATIONS

PCT International Search Report (and translation) issued in PCT Application No. PCT/CN2013/089507, dated Mar. 27, 2014, which published Jul. 3, 2014 as WO2014/101679, of which the instant application is a national phase; 8 pgs.

(Continued)

*Primary Examiner* — Frank D Ducheneaux
(74) *Attorney, Agent, or Firm* — Harness, Dickey & Pierce, P.L.C.

(57) ABSTRACT

The present invention relates to a thermosensitive label for monitoring the quality state of a thermosensitive article. The present invention also relates to a preparation method of the thermosensitive label and a thermosensitive article using the thermosensitive label. The thermosensitive label according to the present invention comprises two laminated layers which are physically-separated of a thermosensitive function layer and an adsorption-indication function layer. The (Continued)

two laminated layers are stored and transported separately, and combined together in use.

15 Claims, 4 Drawing Sheets

(51) Int. Cl.
 *B32B 27/10*  (2006.01)
 *B32B 27/20*  (2006.01)
 *G01K 3/04*  (2006.01)
 *G01K 11/12*  (2006.01)
 *G09F 3/04*  (2006.01)
 *G09F 3/00*  (2006.01)
 *G09F 3/02*  (2006.01)

(52) U.S. Cl.
 CPC ............... *G01K 3/04* (2013.01); *G01K 11/12* (2013.01); *G09F 3/0291* (2013.01); *B32B 2255/12* (2013.01); *B32B 2255/26* (2013.01); *B32B 2260/028* (2013.01); *B32B 2260/046* (2013.01); *B32B 2307/4026* (2013.01); *B32B 2307/412* (2013.01); *B32B 2307/724* (2013.01); *B32B 2519/00* (2013.01); *C09J 2203/334* (2013.01); *G09F 2003/0257* (2013.01); *Y10T 156/10* (2015.01)

(56) References Cited

FOREIGN PATENT DOCUMENTS

| | | |
|---|---|---|
| CN | 102789743 | 11/2012 |
| CN | 102853946 | 1/2013 |
| EP | 2728328 A1 | 5/2014 |
| JP | 3144187 | 3/2001 |
| WO | WO2005/078402 | 8/2005 |

OTHER PUBLICATIONS

Extended European Search Report issued in EP13869238.9 dated Jun. 8, 2016 which has the same priority as the instant application; 10 pgs.

US 9,744,742 B2

THERMOSENSITIVE LABEL AND METHODS OF PREPARING AND USING THE THERMOSENSITIVE LABEL

CROSS REFERENCE TO RELATED APPLICATIONS

This patent application is a U.S. national stage filing under 35 U.S.C. §371 of International Application No. PCT/CN2013/089507 filed Dec. 16, 2013 (published as WO2014/101679 on Jul. 3, 2014), which claims priority of Chinese application No. 201210567490.4 filed Dec. 24, 2012. The disclosures of the applications identified in this paragraph are incorporated herein by reference in their entirety.

TECHNICAL FIELD

The present invention relates to a thermosensitive label for monitoring the quality state of a thermosensitive article, a preparation method thereof, and a method for monitoring the quality state of a thermosensitive article using the same. In particular, the present invention relates to the preparation of a thermosensitive label by using a volatile dye. The thermosensitive label, by means of a colour change of the adsorption material layer resulted from the volatilization of the volatile dye and then adsorption of the volatile dye by the adsorption material layer, indicates whether a thermosensitive article deteriorates or fails due to influence of temperature or accumulated heat exposure.

BACKGROUND ART

Many articles or products are very sensitive to heat exposure, such as most of vaccines (usually stored and transported between 2° C. and 8° C.), biological products, bioactive samples and some drugs and the like, as well as fresh foods such as fresh milk, dairy product, fresh meat, fresh fish and the like, need to be stored or transported at low temperature. For long time, the main methods for ensuring the safe use of these articles/products, especially drugs or foods, comprise labeling the valid period, the quality guarantee period or the fresh preservation period. However, these methods usually can not tell whether those drugs or foods which need to be stored and transported at low temperature have been exposed at a temperature exceeding the safe storage and transport conditions for too long time, and thus to excessive heat. The safety and efficacy of various thermosensitive articles can be better ensured by using a simple and inexpensive method to accurately indicate whether the thermosensitive articles, such as fresh food, vaccines, bioactive samples and the like which need to be stored at low temperature, deteriorate, fail or lose activity due to excessive heat exposure.

In the 1990s, the World Health Organization (WHO) began to pay attention to the problem that vaccines are exposed to heat during the cold chain storage and transport, because this will lead to a decrease in the immune effect of the vaccines, thereby reducing the protection of vaccines for children. Subsequently, the WHO called for the development of a label which is easy to use and inexpensive so as to accurately reflect the heat history of vaccines from leaving the factory after manufacture, being transported and stored, to reaching end users. The essential requirements for the label are shown as follows: 1. it can accurately indicate the vaccine exposed to excessive heat and thus restrict the use thereof; 2. it has a small volume, and can be adhered to a vaccine bottle, an ampoule, an injector or the like; 3. it is stable and reliable during the whole process from production to actual use; and 4. it is suitable for mass production in low cost and meets the global demand for vaccines of United Nations International Children's Emergency Fund (UNICEF).

In 1996, the TempTime company (formerly known as Lifelines) in USA developed a label which can meet the requirements of WHO for the first time. The label is applied to the polio vaccines produced by three vaccine manufacturers, i.e., GlaxoSmithKline, Sanofi-Pasteur and Novartis. The labels provided by Temptime are classified into three categories according to the functions thereof. The first type is Critical Temperature Indicator (CTI), which immediately changes colour once the temperature exceeds a set value. The second one is Critical Temperature-Time Indicator (CTTI), the colour change of which delays to some extent, that is, the label changes colour after exposing to a temperature above the set value for several minutes or tens of minutes. The third one is known as Time-Temperature Indicator (TTI), which has a longer response time, and in which the temperature sensing material changes colour after receiving a certain amount of heat. This kind of label is a label suitable for indicating the heat history of vaccines.

Currently, there are hundreds of patents related to such thermosensitive labels in the world. These patented technologies can be classified into mechanical type, chemical type, enzyme reaction type, microorganism type, polymer type, electronic type, diffusion type and the like according to the operating principles of the products. These technologies are mainly based on mechanical property, electrical property, diffusion property, bio-enzyme reaction, polymerization and the like of the functional materials. There are mainly three kinds of TTI labels which are well established and already commercialized: polymer type, enzyme reaction type and diffusion type.

The polymer type label is developed by TempTime company in USA, and is based on the formation of a coloured polymer as a result of solid state 1,4-addition polymerization of a substituted diacetylene derivative. The rate of polymerization increases as the temperature rises. The continuously formed polymer makes the colour darker continuously, which, by comparison with the surrounding colour, indicates whether the vaccines have been exposed to excessive heat. It is required to screen and synthesize suitable polymeric monomer for such a label. Further, the label needs to be stored at the temperature of −18° C. or even lower after its production, which obviously increases the cost of use of the label.

An early indicator of enzyme reaction type is essentially a kind of pH indicator, which indicates the heat history by measuring the colour change caused by the pH value change of the medium which is caused by the protons $H^+$ released from the enzyme-catalyzed hydrolysis of lipids substrate. The enzymatic hydrolysis becomes faster as the temperature rises, and thus the release rate of protons also becomes faster. A typical one is Vitsab ring indicator developed by a Swedish company.

An earlier typical product of diffusion type label is the 3M Monitor Mark indicator produced by 3M company in USA, based on the diffusion of a dye on a string, in which the temperature indicating range and response time depend on the type of dyes. Another form of diffusion type indicator can be prepared by coating a porous substrate with a material having a specific melting point. The optical refractive indexes of the substrate and the material are close to each other. When the coating material melts at above a specific temperature and diffuses into the porous substrate so that the air in the pores of the substrate is exhausted, the transmittance of the substrate increases, and thus a colour change can be achieved, showing the accumulated heat exposure.

Currently, WHO classifies about twenty vaccines into 4 categories based on their thermal stability: the most unstable vaccines, unstable vaccines, stable vaccines and highly stable vaccines, and thus proposes the technical requirements for corresponding thermosensitive labels. The technical standards thus established take the properties of indicator products in the prior art into account, but are not based on the thermal stability of vaccines per se completely. In fact, since each of the about twenty vaccines which need cold chain storage and transport and to be monitored during the whole process has different thermal stability, an ideal thermosensitive label should be an individualized thermosensitive label adequately reflecting the thermal stability of the product indicated, i.e. the rate of colour change and the temperature effect thereof should keep as consistent as possible with the failure process of the indicated product.

Therefore, in the art there is still a need for a thermosensitive label and a method for monitoring the heat history of a thermosensitive article, in order to monitor the storage and transport of a thermosensitive article conveniently, and accurately indicate whether a thermosensitive article fails or deteriorates. Particularly, the thermosensitive label per se can be stored at room temperature before use.

SUMMARY OF THE INVENTION

One object of the present invention is to provide a thermosensitive label for monitoring the quality state of a thermosensitive article, which is used for monitoring the heat history of a thermosensitive article and indicating whether the thermosensitive article fails or deteriorates due to excessive heat exposure. Moreover, the thermosensitive label of the present invention can be stored at room temperature for a long time before use. In other words, the thermosensitive label of the present invention per se is not thermosensitive before use.

Another object of the present invention is to provide a method for preparing a thermosensitive label for monitoring the quality state of a thermosensitive article.

Yet another object of the present invention is to provide a method for monitoring the quality state of a thermosensitive article.

For this purpose, the present invention provides a simple and effective thermosensitive label that can be used for monitoring the accumulated heat exposure (i.e. heat history) of a thermosensitive article and for alerting of excessive heat exposure during storage and transportation of the thermosensitive article. When such labels are used to monitor the process of storage and transport of thermosensitive articles, it can be known whether the accumulated heat exposure exceeds a preset limit. Moreover, the thermosensitive label of the present invention is not sensitive to heat before use. In other words, the thermosensitive label of the present invention can be stored at room temperature or even higher temperature for a long time, and thus can be transported and distributed conveniently.

The first aspect of the present invention provides a thermosensitive label for monitoring the quality state of a thermosensitive article, comprising two laminated portions of a thermosensitive function layer and an adsorption-indication function layer, which are physically independent of each other before use. The thermosensitive function layer comprises: a sealing film; a first substrate material layer on the sealing film, wherein the first substrate material layer is preferably made of white paper, copy paper, or printing paper, more preferably attached to the sealing film by aqueous adhesive; a volatile dye layer formed on the first substrate material layer, wherein the difference between the activation energy of the volatilization process of the volatile dye layer and that of the quality deterioration process of the thermosensitive article is within a predetermined range, and wherein the volatile dye layer is preferably formed by coating or impregnating the first substrate material layer with the volatile dye; and a first release film layer, which covers the volatile dye layer, wherein the sealing film and the first release film layer are larger than the volatile dye layer in dimension, and the volatile dye layer is sealed between the sealing film and the first release film layer. The adsorption-indication function layer comprises: a second substrate material layer, which is made of transparent material, preferably of polymer film; a reference indication layer, which is located above the second substrate material layer and has an observation window around which a reference colour is present; an adsorption material layer, which is located under the second substrate material layer and is able to adsorb the dye from the volatile dye layer, wherein the adsorption material layer is overlapped or aligned with the observation window in the vertical direction, and is preferably larger than the observation window in dimension; an isolation layer made of opaque material and located under the adsorption material layer, wherein the isolation layer is larger than the observation window in dimension, preferably larger than or equal to the volatile dye layer in dimension, more preferably larger than, equal to or smaller than the adsorption material layer in dimension, and the volatile dye is able to diffuse through the isolation layer; and a second release film layer, which covers the isolation layer.

In use, the first release film layer and the second release film layer are firstly peeled off, the isolation layer of the adsorption-indication function layer is aligned with the volatile dye layer of the thermosensitive function layer; the adsorption material layer, the isolation layer and the volatile dye layer are sealed between the sealing film and the second substrate material layer; and then the sealing film is adhered to a thermosensitive article. Alternatively, the sealing film is firstly adhered to a thermosensitive article, then the first release film layer and the second release film layer are peeled off, the isolation layer of the adsorption-indication function layer is aligned with the volatile dye layer of the thermosensitive function layer, and the adsorption material layer, the isolation layer and the volatile dye layer are sealed between the sealing film and the second substrate material layer.

In use, the thermosensitive label of the present invention is applied to one or more regions of a thermosensitive article. During the storage and transport of the thermosensitive article, the volatile dye absorbs heat, volatilizes, diffuses through the isolation layer, and then is adsorbed by the adsorption material layer. The adsorption material layer gradually becomes darker after adsorbing the volatile coloured dye, which can be observed through the observation window. The colour depth of the adsorption material layer is positively correlated with the amount of the adsorbed dye, i.e., the amount of the adsorbed dye is positively correlated with the volatilization amount thereof, and the volatilization amount of the dye is positively correlated with the accumulated heat exposure thereof (related to the degree of deterioration of the thermosensitive article). Selecting the type of dye according to specific thermosensitive article and controlling the rate of volatilization, diffusion and adsorption in combination with other methods allow the colour response of the adsorption material layer caused by the dye adsorption to respond to the activity change of the thermosensitive article, and thereby it can be readily determined whether the thermosensitive article is within the valid period or shelf life simply through the colour change of the adsorption-indication function layer.

Additionally, the thermosensitive label is not sensitive to heat exposure before use since the thermosensitive label of the present invention is presented as two laminated portions of a thermosensitive function layer and an adsorption-indication function layer, which are physically independent of each other before applying to a thermosensitive article, and the volatile dye layer in the thermosensitive function layer of the present invention is sealed between the sealing film and the first release film layer before use. Therefore, the thermosensitive label of the present invention per se can be stored and transported at room temperature before use, without influencing the properties of the thermosensitive label of the present invention.

Again, the thermosensitive label of the present invention per se will not be influenced by the heat history of the thermosensitive label during the storage and transport before use, because the thermosensitive label can be immediately combined and applied before use. Thus, the thermosensitive label of the present invention is able to reflect the heat history of thermosensitive article more accurately.

The second aspect of the present invention relates to a thermosensitive article using the thermosensitive label of the present invention.

The third aspect of the present invention relates to a method for preparing the thermosensitive label of the present invention.

The fourth aspect of the present invention relates to a method for monitoring the thermosensitive article using the thermosensitive label of the present invention.

Figure 1:
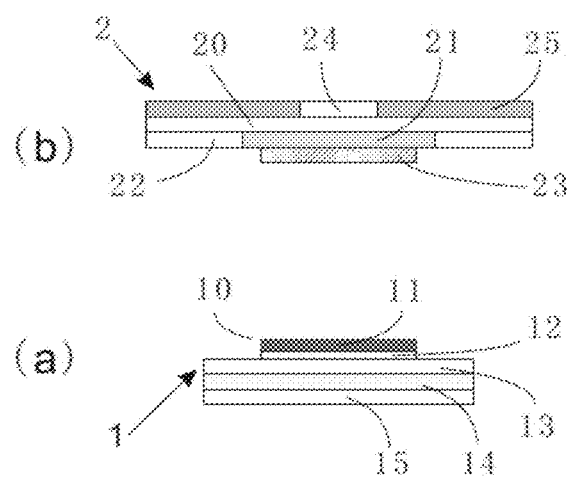
FIG. 1 is a structure diagram of the thermosensitive label according to one embodiment of the present invention.

The terms and the reference numbers thereof used in the present invention are listed as follows:
thermosensitive function layer 1
adsorption-indication function layer 2
first substrate material layer 10
volatile dye layer 11
aqueous adhesive layer 12
sealing film 13
self-adhesive layer 14
release film layer 15
transparent film substrate 20
adsorption indicating area 21
adsorption material layer 22
isolation layer 23
observation window 24
reference colour 25

DETAILED DESCRIPTION OF EMBODIMENTS

The first aspect of the present invention provides a thermosensitive label product for monitoring the accumulated heat exposure of a thermosensitive article and for alerting of excessive heat exposure thereof. This label comprises two laminated portions of a thermosensitive function layer and an adsorption-indication function layer, which are physically independent of each other before use, wherein
the thermosensitive function layer comprises:
a sealing film;
a first substrate material layer over the sealing film, wherein the first substrate material layer is preferably made of white paper, copy paper, or printing paper, more preferably attached to the sealing film by aqueous adhesive;
a volatile dye layer formed on the first substrate material layer, wherein the difference between the activation energy of the volatilization process of the volatile dye layer and that of the quality deterioration process of the thermosensitive article is within a predetermined range, and wherein the volatile dye layer is preferably formed by coating or impregnating the first substrate material layer with the volatile dye; and
a first release film layer, which covers the volatile dye layer, wherein the sealing film and the first release film layer are larger than the volatile dye layer in dimension, and the volatile dye layer is sealed between the sealing film and the first release film layer,
and
the adsorption-indication function layer comprises:
a second substrate material layer, which is made of transparent material, preferably of polymer film;
a reference indication layer, which is located above the second substrate material layer and has an observation window around which a reference colour is present;
an adsorption material layer, which is located under the second substrate material layer and is able to adsorb the dye from the volatile dye layer, wherein the adsorption material layer is overlapped or aligned with the observation window in the vertical direction, and is preferably larger than the observation window in dimension;
an isolation layer made of opaque material and located under the adsorption material layer, wherein the isolation layer is larger than the observation window in dimension, preferably larger than or equal to the volatile dye layer in dimension, more preferably larger than, equal to or smaller than the adsorption material layer in dimension, and the volatile dye is able to diffuse through the isolation layer; and
a second release film layer, which covers the isolation layer.

In use, the first release film layer and the second release film layer are peeled off, the isolation layer of the adsorption-indication function layer is aligned with the volatile dye layer of the thermosensitive function layer, the adsorption material layer, the isolation layer and the volatile dye layer are sealed between the sealing film and the second substrate material layer, and then the sealing film is adhered to a thermosensitive article. Alternatively, the sealing film is adhered to a thermosensitive article, then the first release film layer and the second release film layer are peeled off, the isolation layer of the adsorption-indication function layer is aligned with the volatile dye layer of the thermosensitive function layer, and the adsorption material layer, the isolation layer and the volatile dye layer are sealed between the sealing film and the second substrate material layer.

In use, the volatile dye in the thermosensitive function layer will volatilize upon heat exposure (for example, under a desired disposal temperature, under a desired storage and/or transport temperature, in the case that the disposal temperature unexpectedly rises, and under a desired disposal temperature for accelerated test, for example in the case that the desired disposal temperature for accelerated test is 25° C. and/or 37° C.). After diffusing through the isolation layer, the volatilized dye is irreversibly adsorbed by the adsorption material in the adsorption material layer. The colour of the adsorption material layer becomes darker after adsorbing the volatilized dye (e.g. the colour in the adsorption indication area 21 of the adsorption material layer 22 shown in FIG. 1 becomes darker), which can be observed through the observation window of reference indication layer. The colour depth of the adsorption material layer is positively correlated with the amount of the adsorbed dye, while the latter is positively correlated with the accumulated heat exposure of the thermosensitive article.

By using the above thermosensitive labels according to the present invention, the accumulated heat exposure can be characterized by the colour depth of the adsorption material layer visually and simply. In one embodiment, the colour depth can be further characterized by the change in colour difference $\Delta E^*_{ab}$. In one embodiment, the colour change rate of the adsorption material layer can be characterized by the setting colour difference variation range divided by the time needed to reach the colour difference variation range. In one embodiment, the change in the colour change rate over time follows Arrhenius equation, and can be characterized by the activation energy $E_a$ obtained from this equation.

The second aspect of the present invention provides a volatile dye, preferably a coloured volatile dye, used for preparing the thermosensitive label. According to the present invention, the preferred volatile dye is the guaiazulene of the following formula I or the derivatives thereof:

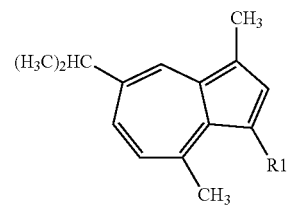

wherein,
R1 includes but not limited to hydrogen, halogen, linear or branched $C_{1-6}$ alkyl, linear or branched $C_{1-6}$ alkoxy, linear or branched $C_{1-6}$ alkylhydroxy, —COR2, and —COOR2;
R2 is selected from hydrogen, linear or branched $C_{1-6}$ alkyl (such as methyl, ethyl, n-propyl, isopropyl, n-butyl, sec-butyl, tert-butyl, n-pentyl, isopentyl, neopentyl, n-hexyl, etc.), and linear or branched $C_{1-6}$ alkylamino (such as methylamino, ethylamino, n-propylamino, isopropylamino, n-butylamino, sec-butylamino, tert-butylamino, n-pentylamino, isopentylamino, neopentylamino, n-hexylamino and the like).

In one embodiment, R1 is selected from hydrogen, —COH, CH$_2$OH, and —COOR2, and R2 is selected from hydrogen, methyl, ethyl, n-propyl, isopropyl, n-butyl, sec-butyl, and tert-butyl.

According to one embodiment of the present invention, the volatile dye layer can comprise the mixture of one or more (e.g. two, three, or more than three) of guaiazulene or the derivatives thereof.

According to one embodiment of the present invention, the volatile dye layer can also comprise one or more volatilization auxiliaries, which can be various volatile materials that can regulate the volatilization rate of the dye and the temperature effect thereof. In a preferred embodiment, the volatilization auxiliaries can be various volatile compounds, including but not limited to linear or branched or aromatic or cyclic hydrocarbons (including but not limited to naphthalene and anthracene), various linear or branched or cyclic or aromatic alcohols (including but not limited to erythritol, lauryl alcohol, tridecanol, tetradecanol, pentadecanol, hexadecanol, heptadecanol, stearyl alcohol, etc.), various linear or branched or cyclic or aromatic carboxylic acids (including but not limited to maleic acid, fumaric acid, lauric acid, tridecanoic acid, myristic acid, pentadecanoic acid, palmitic acid, adipic acid, sebacic acid, dodecanedioic acid, etc.), various amino acids (including but not limited to aminobenzoic acid, leucine, phenylalanine, etc.), various esters (including but not limited to ethyl acetate, etc.), various sulfones (including but not limited to diphenyl sulfone, diphenyl disulfone, dibenzyl sulfone, dibutyl sulfone, etc.). The volatilization auxiliaries can also be a variety of volatile natural substances (including but not limited to naphthalene, camphor, etc.).

The adsorption material used in the thermosensitive label of the present invention can be any material that is able to irreversibly adsorb the volatile dye. In one embodiment, the adsorption rate at which the adsorption material adsorbs the volatile dye is higher than the volatilization rate of the volatile dye. In one embodiment, the adsorption rate at which the adsorption material adsorbs the volatile dye is much higher than the volatilization rate of the volatile dye. In one embodiment, the adsorption rate at which the adsorption material adsorbs the volatile dye is much higher than the volatilization rate of the volatile dye, so that the adsorption rate for the dye is substantially merely related to the volatilization rate of the dye. In one embodiment, the adsorption rate at which the adsorption material adsorbs the volatile dye is much higher than the volatilization rate of the volatile dye, so that the apparent volatilization rate of the dye is only influenced by the temperature (or the absorbed heat), but not influenced by for example the factor that it is blocked by the saturated vapour/almost saturated vapour produced by its volatilization, and the like. In one embodiment, the adsorption material includes but not limited to oily or aqueous self-adhesive, commercial self-adhesive paper, self-adhesive tape and the like.

The material and structure of the isolation layer used in the thermosensitive label of the present invention are not particularly limited, as long as the isolation layer possesses the following two functions: firstly, covering the colour of the thermosensitive function layer, for which the material of the isolation layer is preferably a white opaque material; secondly, providing the diffusion path for the volatile dye to diffuse from the thermosensitive function layer to the adsorption material layer after volatilization, preferably with the function of regulating the diffusion rate at the same time. For example, the material of the isolation layer can be but not limited to ordinary white paper, copy paper, printing paper, self-adhesive label paper and the like. In one embodiment, white paper of 60-120 $g/cm^2$ can be used as the material of the isolation layer. In one embodiment, white paper of 60-120 $g/cm^2$ coated with a certain amount of self adhesive that can irreversibly adsorb the volatile dye can be used as the material of the isolation layer. In one embodiment, two layers of white paper of 60-120 $g/cm^2$, coated therebetween with a certain amount of self adhesive that can irreversibly adsorb the volatile dye, can be used as the material of the isolation layer. The change in structure can be reflected by the changes of various layers during use of the label: in addition to the thermosensitive function layer of the label presenting the colour of the volatile dye, the colour of the volatile dye can be presented only at the adsorption material layer when the white paper is used as the isolation layer. When the white paper coated with adsorption material is used as the material of the isolation layer, the colour of the volatile dye can be presented at both the adsorption material layer and the isolation layer; and when an isolation layer of two-layer paper coated therebetween with a certain amount of adsorption material is used, the colour of the volatile dye can be presented both at the adsorption material layer and between the white papers of the isolation layer, so that the colour change of the thermosensitive label of the present invention in use can be shown more effectively.

The present invention also provides the preparation process and storage ways for the thermosensitive label. According to the method of the present invention, the preparation and storage of the thermosensitive label are divided into two independent portions for a thermosensitive function layer and an adsorption-indication layer, and includes two independent processes for respectively preparing two laminated portions of the thermosensitive function layer and the adsorption-indication function layer.

According to the present invention, the process for preparing the thermosensitive function layer comprises: providing a sealing film; providing a first substrate material, preferably made of white paper, copy paper, or printing paper on the sealing film, and more preferably, attaching the first substrate material to the sealing film with an aqueous adhesive; forming a volatile dye layer on the first substrate material, preferably by coating or impregnating the first substrate material with the volatile dye, wherein the difference between the activation energy of the volatilization process of the volatile dye layer and that of the quality deterioration process of the thermosensitive article is within a predetermined range; and covering the volatile dye layer with a first release film layer, wherein the sealing film and the first release film layer are larger than the volatile dye layer in dimension, and the volatile dye layer is sealed between the sealing film and the first release film layer, thereby forming the thermosensitive layer.

In one embodiment, by a roll-to-roll production method, the white paper of 60-120 $g/cm^2$ is coated with a layer of aqueous adhesive which does not adsorb the thermosensitive function material, and then is attached to one side of the polymer film; before or after being attached, the other side of the polymer film is coated with a layer of self adhesive, which is used to attach the label to the thermosensitive article in use, and the surface of the self adhesive is protected with a release film before use. In one embodiment, by a roll-to-roll production method, the thermosensitive function material is coated onto one side of the white paper of the substrate by means of impregnation. The thermosensitive function material is dissolved in a suitable organic solvent (such as ethanol, acetone, diethyl ether, petroleum ether, ethyl acetate, etc.), with a preferred material concentration of 100-400 g/L and a preferred moving speed of the substrate material of 3-30 m/min when coating or impregnation. In one embodiment, the material coated with volatile dye is die cut into strips according to the size required for the label after being rolled up, and then sealed for storage. In one embodiment, the dimension of substrate of the die cut thermosensitive function material is 5-15 mm, preferably 8-12 mm. In one embodiment, the dimension of the die cut polymer film is 8-30 mm, preferably 10-20 mm.

According to the present invention, the manufacturing process of the adsorption-indication function layer comprises: providing a second substrate material made of a transparent material, preferably of a polymer film; forming a reference indication layer on the second substrate material, wherein the reference indication layer has an observation window around which a reference colour is present; forming an adsorption material layer under the second substrate material, wherein the adsorption material layer can adsorb the dye from the volatile dye layer, is overlapped or aligned with the observation window in the vertical direction, and is preferably larger than the observation window in dimension; forming an isolation layer with an opaque material under the adsorption layer, wherein the isolation layer is larger than the observation window in dimension, preferably larger than or equal to the volatile dye layer in dimension, more preferably larger than, equal to or smaller than the adsorption material layer in dimension, and the volatile dye is able to diffuse through the isolation layer; and forming a second release film under the isolation layer, so as to form the adsorption-indication function layer.

According to the present invention, the isolation layer, the adsorption material layer, and the reference indication layer constitute another independent portion of the label, known as the adsorption-indication function layer. In one embodiment, a transparent self adhesive that can irreversibly adsorb the volatile dye is used as the adsorption material. The self adhesive is coated on the transparent polymer film such as plastic film, and the surface of the self adhesive can be protected with a release film before use. In one embodiment, a paper coated with a self adhesive is used as the reference indication layer, wherein the colour of the paper is used as the colour of reference end point, and an observation window of circular or rectangular or other geometrical shape is formed by roll-to-roll die cutting. In one embodiment, by a roll-to-roll production method, the reference indication layer is attached to one side of the second substrate material without adsorption material applied. In one embodiment, by a roll-to-roll production method, the isolation layer required for the label size is attached to the adsorption material layer by die cutting, and can be protected with a release film. In one embodiment, the adsorption-indication function layer is die cut into strips according to the size required for the label before being rolled up, and then packaged for storage. In one embodiment, the dimension of the die cut observation window is 3-10 mm, preferably 4-6 mm. In one embodiment, the dimension and shape of the die cut isolation layer are consistent with those of the volatile dye layer on the thermosensitive function layer. In one embodiment, the dimension of die cut isolation layer is larger than the volatile dye layer on the thermosensitive function layer. In one embodiment, the dimension of the die cut adsorption-indication function layer is consistent with that of the thermosensitive function layer. In one embodiment, the dimension of the die cut adsorption-indication function layer is larger than that of the thermosensitive function layer. In one embodiment, the dimension of the die cut adsorption-indication function layer is smaller than that of the thermosensitive function layer.

The sixth aspect of the present invention provides the use method of the thermosensitive label. In one embodiment, the thermosensitive function layer is pasted to a proper position on the packaging container of the thermosensitive article, preferably by first peeling off the release film under the thermosensitive function layer, and then pasting the thermosensitive function layer to a proper position on the packaging container of the thermosensitive article through the exposed self adhesive layer on the bottom of the sealing film; then the release film protection layer of the adsorption-indication layer and the release film protection layer on the top of the thermosensitive function layer are peeled off, the isolation layer is aligned with the thermosensitive function layer, and those two parts are tightly attached to each other and sealed with the self adhesive of the adsorption-indication function layer. In one embodiment, the steps are as follows: first peeling off the release film protection layer of the adsorption-indication function layer and the release film protection layer on the top of the thermosensitive function layer, aligning the isolation layer with the thermosensitive function layer, and attaching and sealing the two parts tightly with the self adhesive of the adsorption-indication function layer; then peeling off the release film under the bottom of the thermosensitive function layer, and pasting the whole label to a proper position on the packaging container of the thermosensitive article with the exposed self adhesive layer. Thus, in the case of monitoring the effect of accumulated heat exposure or temperature on a thermosensitive article, for example during storage and/or transport, the volatile dye will not leak out from the sealing system which is consisted of the sealing film and the second substrate material, and thereby all of the volatilized dye caused by subjecting to change of temperature/heat exposure will substantially be adsorbed into the adsorption material. According to the present invention, the colour depth of the adsorption material layer can be observed or determined through the observation window of the label when the monitored thermosensitive article is not influenced by heat exposure or temperature any more, for example after the required storage and/or transport. The colour depth is positively correlated with the accumulated heat exposure of the thermosensitive article. Therefore, in one embodiment, the accumulated heat exposure of the thermosensitive article can be visually presented with the colour of the adsorption material layer in the thermosensitive label of the present invention.

The present invention also provides the method for monitoring with the thermosensitive label of the present invention, including applying the thermosensitive label of the present invention in one or more regions of the thermosensitive article, observing the colour of the adsorption material layer through the observation window as needed, if the observed colour is darker than the reference colour, the thermosensitive article fails; and if the observed colour is lighter than the reference colour, it is indicated that the thermosensitive article does not fail.

In one embodiment, the method comprises the following steps:

(i) Providing a thermosensitive article, determining the time period for which the thermosensitive article can last to keep the valid quality state at the desired disposal temperature (e.g. storage and/or transport, or accelerated test) (the time period can refer to the longest time for which the thermosensitive article can last, also known as valid period, designated as t1), determining the material of the thermosensitive function layer as well as the material of the adsorption-indication layer and the structure thereof for manufacturing the thermosensitive label according to the time period (for example, by selecting different dyes to obtain different volatilities, or by selecting different materials of the isolation layer to obtain different diffusion rates of the volatile dye, or by selecting different adsorption materials to obtain different adsorption rates), and manufacturing the thermosensitive function layer and the adsorption-indication function layer of the thermosensitive label according to the method of the present invention.

(ii) According to the method of the present invention, aligning the thermosensitive function layer of the thermosensitive label with the adsorption-indication function layer of the thermosensitive label, sealing and attaching them tightly, and measuring the initial colour difference in the observation window with a colorimeter (with no volatilization and adsorption of dye at this time, the initial colour difference in the observation window can be expressed as C0). The label is placed at the desired disposal (such as storage and/or transport, or accelerated stability test) temperature (which can be expressed as T1 in the present invention) for storage, recording colour difference in the observation window regularly. Plotting a curve of the colour difference as a function of time, and obtaining the colour difference at the time of the storage valid period t1 of the thermosensitive article (the colour difference in the observation window at this time can be expressed as C1), and using it as the reference colour. The change rate of the colour difference at this disposal temperature T1 can be obtained by dividing the change in colour difference (C1−C0) by the time needed for achieving the change in colour difference.

(iii) In one embodiment, storing the thermosensitive label at different disposal temperatures, and recording colour difference in the observation window regularly. The curve of the colour difference can be plotted as a function of time, and the time needed for the colour in the observation window to reach the end point colour difference at the disposal temperature can be obtained. The time is compared with the valid period of the thermosensitive article at this disposal temperature, and in ideal disposal conditions, those two time periods should be as close as possible.

(iv) Dividing the change in colour difference (C1−C0) by the time t1 needed for achieving the change in colour difference at different disposal temperatures, to obtain the change rate of the colour difference at different disposal temperatures T1. The change rate of the colour difference at different disposal temperature is logged, and a curve is plotted using this log value as ordinate and the reciprocal of the disposal temperature (thermodynamic temperature) as abscissa. In principle, the activation energy of the thermosensitive label to reach the end point colour can be obtained based on the Arrhenius equation $$\log k = -\frac{E}{2.303\ RT} + \log A,$$

wherein critical parameters such as activation energy E, rate constant k, thermodynamic temperature T, etc. are included. In an ideal condition, the activation energy should be close to the activation energy of the thermosensitive product to fail.

(v) Observing the colour of the adsorption layer through the observation window of the adsorption-indication function layer, and comparing it with the reference colour to estimate the quality state of the thermosensitive article:

If the colour in the observation window is lighter than the reference colour, it is indicated that the thermosensitive article remains in an effective quality state;

If the colour in the observation window is darker than the reference colour, it is indicated that the thermosensitive article is not in an effective quality state.

The thermosensitive label of the present invention can be used to monitor a broad thermal stability range of thermosensitive articles. For example, this includes but not limited to storing for 2 hours to 45 days at 37° C., storing for 6 hours to 1 year at 25° C., with a corresponding activation energy of 60-100 kJ/mol. In one embodiment, guaiazulene is used as the volatile dye, a self adhesive irreversibly adsorbing guaiazulene is used as the adsorption material, and white paper of 60-120 g/cm², or paper coated with a certain amount of self adhesive, or two layers of paper of 60-120 g/cm² coated therebetween with a certain amount of self adhesive is used as the isolation layer. The produced thermosensitive label uses a colour difference of 30-40 relative to an ordinary white paper as end point. When stored at 37° C., the time for reaching the end point is between 1 and 30 hours, and when stored at 25° C., the time for reaching the end point is between 3 and 75 hours. In one embodiment, a guaiazulene derivative substituted with R1=COOCH$_3$ is used as the volatile dye, a self adhesive irreversibly adsorbing the guaiazulene derivative is used as the adsorption material, and white paper of 60-120 g/cm², or paper coated with a certain amount of self adhesive, or two layers of paper of 60-120 g/cm² coated therebetween with a certain amount of self adhesive is used as the isolation layer. The thermosensitive label produced according to the present invention uses a colour difference of 30-40 relative to an ordinary white paper as end point. When stored at 37° C., the time for reaching the end point is between 2 and 35 days, and when stored at 25° C., the time for reaching the end point is between 6 and 80 days. In one embodiment, a guaiazulene derivative substituted with R1=COOC(CH$_3$)$_3$ is used as the volatile dye, a self adhesive irreversibly adsorbing the guaiazulene derivative is used as the adsorption material, and white paper of 60-120 g/cm², or paper coated with a certain amount of self adhesive, or two layers of paper of 60-120 g/cm² coated therebetween with a certain amount of self adhesive is used as the isolation layer. The thermosensitive label produced according to the present invention uses a colour difference of 30-40 relative to an ordinary white paper as end point. When stored at 37° C., the time for reaching the end point is between 1.5 and 30 days, and when stored at 25° C., the time for reaching the end point is between 5 and 60 days.

The object of an embodiment of the present invention is to produce an individualized thermosensitive label of which the colour change rate and the temperature effect can adequately reflect the thermal stability of the indicated product. Such an individualized label can be designed for the specific storage requirements and characteristics of a certain type of thermosensitive articles. In one embodiment, the object can be achieved by selecting a volatile dye of which the volatilization rate and the activation energy can adequately reflect the thermal stability of the indicated product, or other volatile opaque materials.

The object of an embodiment of the present invention is to produce a dye or a material formulation by adding a volatilization auxiliary to the selected volatile dye or other volatile opaque materials, to change the volatilization rate of the volatile materials and the temperature effect thereof, such that it can accurately reflect the thermal stability of the indicated thermosensitive article.

The object of an embodiment of the present invention is to produce a thermosensitive label that can be stored at room temperature. The object can be achieved by the following method: the two portions of the thermosensitive function layer and the adsorption-indication function layer are separately produced and stored, and combined with each other in use; after the thermosensitive function layer is coated with the volatile dye, a release film which does not adsorb the thermosensitive function material is used at first to seal and protect the thermosensitive function layer; and the thermosensitive function layer and the adsorption-indication function layer are separately produced and stored, thereby achieving room temperature preservation of these two functional portions.

In one embodiment of the present invention, a product for monitoring of accumulated heat exposure and alerting of excessive heat exposure of a product needed to be stored and transported at low temperature (e.g. the thermosensitive article of the present invention) during storage and transportation is provided, and it is used to determine whether the thermosensitive article deteriorates/fails/loses activity due to excessive heat exposure during cold chain storage and transport. For monitoring and alerting of a product, in the first aspect, based on the volatilization property of the material, the activation energy of the quality deterioration of the product due to heat exposure is represented quantitatively by the activation energy of the volatilization process of the material; in the second aspect, the used volatile material is a coloured material; and in the third aspect, the adsorption material layer, especially the adsorption indicating area in the adsorption material layer, is made of a material that can irreversibly adsorb the coloured volatile dye. Because the volatile material is adsorbed by the adsorption material layer after volatilizing, which results in a significant colour change in the adsorption indicating area, whether the product remains valid or deteriorates/failes/loses activity can be determined.

In one embodiment of the present invention, the thermosensitive function materials, i.e., the volatile dyes: guaiazulene and the derivatives thereof, or a mixture of one or more of them, which are used for producing the volatile dye layer of the thermosensitive label described above, are provided. The volatile material volatilizes after heat exposure, and the volatilization rate and the temperature effect thereof can adequately reflect the deterioration or failure rate of the indicated product and the temperature effect thereof.

In one embodiment of the present invention, the substrate materials used for producing the thermosensitive function layer of the thermosensitive label described above, such as ordinary paper, copy paper, printing paper and the like, are provided.

In one embodiment of the present invention, the materials used for producing the sealing film of the thermosensitive function layer of the thermosensitive label described above, such as polymer materials not permeable to volatile dye, are provided.

In one embodiment of the present invention, the adsorption materials used for producing the adsorption material layer of the thermosensitive label described above, such as various self adhesives, are provided. Preferably, the adsorption material greatly and irreversibly adsorbs the thermosensitive function material (i.e. the volatile dye), and the adsorption rate is much higher than the volatilization rate of the thermosensitive function material, thus ensuring that the apparent volatilization rate is only influenced by temperature.

In one embodiment of the present invention, the adsorption materials used for producing the adsorption material layer of the thermosensitive label described above are provided, wherein the adsorption material irreversibly adsorbs the thermosensitive material, and the colour change rate of the thermosensitive label and the temperature effect thereof are regulated by selecting different adsorption materials.

In one embodiment of the present invention, the production process and the storage method of the thermosensitive label are provided, wherein both of the thermosensitive function layer and the adsorption-indication function layer can be produced by the production processes such as roll-by-roll, die cut, attaching, etc. used in the production of traditional self adhesives; and the optimized material concentrations, the dimensions of each portion of the label, the production speed and the like are provided, such that the thermosensitive label of the present invention can be produced cheaply, conveniently and massively.

In one embodiment of the present invention, the use method of the thermosensitive label is provided. The method is characterized in that, the thermosensitive function layer and the adsorption-indication function layer are combined with each other in use, and are effectively sealed to protect the functional portion of the thermosensitive label from being contaminated by outside, and to avoid that the volatile materials contaminate the product or the package thereof after volatilization.

In one embodiment of the present invention, the test method of the thermosensitive label is provided. The method is characterized in that, the colour difference in the observation window of the label is measured with a colorimeter to quantify the colour change of the label, a proper end point of the colour difference is selected to determine the response time and the colour change rate of the label, and the activation energy parameter of the thermosensitive label is determined with Arrhenius equation. According to two parameters of the valid period and the activation energy of the thermosensitive article at a certain disposal temperature, the thermosensitive material and the label structure applicable to the thermosensitive article are determined with the response time of the label and the activation energy thereof obtained from the test results.

In one embodiment of the present invention, a method for determining the reference colour of the thermosensitive label is provided. The method is characterized in that, the label is stored at a desired disposal temperature, and the colour difference in the observation window is recorded regularly. A curve of the colour difference as a function of time is plotted, the colour difference of the thermosensitive label stored at the disposal temperature for valid period t1 is obtained and used as the reference colour, and then the reference colour is printed.

In one embodiment of the present invention, the application range of the thermosensitive label is provided, wherein the temperature range indicated is between 0° C. and 50° C., the time range indicated varies with the temperature, with a typical time range from 2 hours to 45 days at 37° C., from 6 hours to 1 year at 25° C., from 1 day to 6 years at 5° C., and the activation energy of the response is between 60 kJ/mol and 100 kJ/mol.

EXAMPLES

The present invention will be further described by various types of examples below, but the scope of the present invention is not limited thereto. It can be understood for those skilled in the art that various changes and modifications can be made without departing from the spirit and scope of the present invention. The present invention generally and/or specifically describes the material and the test method used in the test. Although many materials and operation methods used for achieving the objects of the present invention are known in the art, the present invention hereby still describes them as much as possible.

A. Examples of the Thermosensitive Label

The present invention produced a thermosensitive label making use of the volatilization property of materials, and achieved the required effect of colour change by a heat exposure-volatilization-adsorption process. The structure of an exemplary thermosensitive label designed by the inventor and the operating principle thereof are shown in FIG. 1 and FIG. 2.

Figure 2:
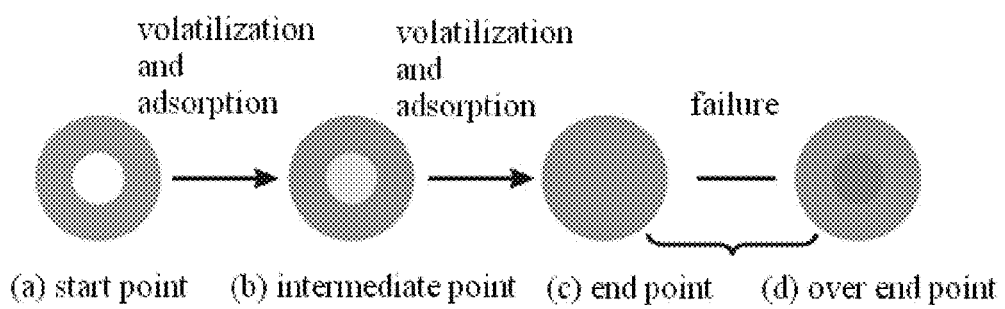
FIG. 2 is a schematic diagram of the colour change process of the thermosensitive label according to one embodiment of the present invention during use.

Referring to the cross-section view shown in FIG. 1, a thermosensitive label of the present invention was described therein, which was consisted of two portions: portion (a) was a thermosensitive function layer 1, and portion (b) was an adsorption-indication function layer 2. These two portions were produced and stored separately, and combined with each other and attached to the surface of the container or the package of the thermosensitive article to be monitored in use.

In the thermosensitive function layer 1, the substrate material layer 10 was coated with a layer of aqueous adhesive 12 at the bottom face, and then attached onto the sealing film 13. Since the sealing film 13 is not permeable to the dye, the diffusion of the dye downward to contaminate the thermosensitive article can be prevented. The bottom face of the sealing film 13 was coated with a layer of self adhesive 14, and protected with a release film 15. The functional site on the top of the substrate material layer 10 was coated with a layer of coloured volatile dye with specific volatilization property, thereby forming the thermosensitive layer 11 of the present invention. The volatilization rate of the used volatile dye and the temperature effect thereof should be kept as consistent as possible with the deterioration or failure rate of the indicated product and the temperature effect thereof. The thermosensitive function layer was dried and sealed for storage. The sealing property can ensure that the thermosensitive function layer can be stored and transported at room temperature.

In the adsorption-indication function layer 2, a transparent plastic thin film was used as the substrate material layer 20. A piece of self adhesive paper was attached to the top face of the substrate film, and the reference colour 25 and the proper product information (e.g. the type of the thermosensitive article which the label is applicable for) or the use information of the label (e.g. the information of how to operate when using the label to determine whether the thermosensitive article fails or not) were printed on the self adhesive paper before attaching, and an observation window 24 of circular or rectangular or other geometrical shapes was formed by die cut. The bottom face of the substrate material layer 20 was coated or impregnated with a layer of adsorption material that can effectively adsorb the volatilized thermosensitive function dye, thereby forming the adsorption material layer 22. In this example, transparent self adhesives that can irreversibly adsorb the volatile dye are used. At the position corresponding to the indication window, an isolation layer 23 of proper dimension was die-cut and attached onto the self adhesive used as the adsorption material. The volatile dye diffused through the isolation layer and was adsorbed by the adsorption layer after volatilizing as a result of heat exposure, so that the colour of the adsorption layer 21 became darker.

FIG. 2 shows the change process of the adsorption-indication function layer 21 relative to the reference colour layer 25 during the use of the thermosensitive label of the present invention from a top view. It is illustrated that the present invention utilized the volatilization property of materials to produce the thermosensitive label, and by means of heat exposure-volatilization-adsorption process, achieved the colour change of the indicating portion of the label, which shows whether the thermosensitive product using this label deteriorates or fails due to excessive heat exposure.

During the combined use of the thermosensitive label and the thermosensitive article, the colour depth of the reference colour layer 25 did not change, while the colour depth of the adsorption-indication function layer became darker as a result of adsorbing the dye volatilized by heat exposure. The rate of colour darkening was influenced by temperature. Even under a desired temperature provided for the thermosensitive article, the volatile dye layer 11 also volatilized to some extent. Accordingly, the colour of the adsorption layer became darker slowly. For example, for a medicine with a valid period of 2 years for storage at 2-8° C., after this medicine was strictly stored at 2-8° C. for 2 years, the adsorption layer 21 gradually became darker due to adsorbing the dye volatilized slowly. At this time, the colour of the adsorption layer 21 was lighter than the reference colour 25, indicating that the medicine was still qualified after storing at 2-8° C. for two years. When the storage time continued, the adsorption-indication function layer 21 kept on darkening due to adsorbing the volatilized dye. Thereafter, the colour thereof was comparable with or darker than that of the reference colour layer 25, indicating that the medicine expired. This process is also an embodiment of the design of the material type of the volatile dye layer 11 and the colour depth of the reference colour layer 25. An embodiment of accelerated test is also described herein.

B. Determination of the Colour of the Reference Colour Layer of the Thermosensitive Label After the thermosensitive label was produced according to the structure shown in FIG. 1, the change in the colour difference at the functional portion of the thermosensitive label, i.e. the observation window, as a function of time was measured by a colorimeter under corresponding constant temperatures (e.g. 5° C., 10° C., 25° C. and/or 37° C., etc.), and the colour change rate of the thermosensitive label and the temperature effect thereof was obtained.

The colour change was digitalized with a colorimeter. When using the colorimeter to measure the colour change, a colour space such as L*a*b* colour space (also known as CIELAB colour space) was first defined. In this colour space, L* represents brightness; a* and b* are chromatic coordinates, and represent the directions of colours; +a* represents the direction of red, −a* represents the direction of green, +b* represents the direction of yellow, −b* represents the direction of blue, and the center is colourless. When the values of a* and b* increased and moved out from the center, the colour saturation increased. In this colour space, the colour difference can be expressed as a single numerical value:

$$\Delta E^*_{ab} = [(\Delta L^*)^2 + (\Delta a^*) + (\Delta b^*)^2]^{0.5}$$

wherein, $\Delta L^*$ is the change of brightness, $\Delta a^*$ is the change along the red-green colour axis, and $\Delta b^*$ is the change along the yellow-blue colour axis. The colour was quantified with a colorimeter such as Minolta CR-310 Chroma Meter, Colorlite Sph860 or the like, so that the colour difference can be quantified. Then the colour change of the produced thermosensitive label was evaluated, and the colour difference of an end point was determined. A white substrate such as A4 paper was used as a reference in the measurement of the colour difference. When the label was in use, the original colour difference was observed through the observation window. The label was stored under the desired disposal temperature, and the colour difference in the observation window was recorded regularly. A curve describing the change in colour difference over time was created, and the colour difference of the thermosensitive label stored at the disposal temperature for valid period t1 was obtained and used as the reference colour, and then the reference colour is printed.

C. Description of the Production and Application of the Thermosensitive Label of the Present Invention with Specific Examples Example 1

Figure 3:
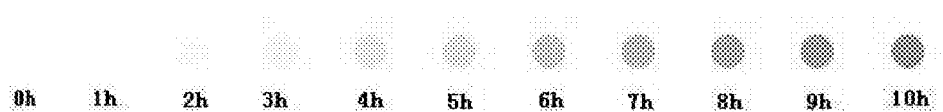
FIG. 3 is an effect diagram showing the colour change of the thermosensitive label, which is prepared by using guaiazulene as the thermosensitive function material in example 1 of the present invention, over time during use.

The thermosensitive function layer was prepared according to the method of the present invention by using guaiazulene ($C_{15}H_{18}$) as the thermosensitive functional material of the thermosensitive label, using white paper of 60 g/cm² (two-side offset paper, Beijing Xinaopeng technology Co., LTD) as the substrate of the thermosensitive function material, using polymer (PP) plastic film as the sealing film, and using a commercially available release film (PET release film, Suzhou Dawan plastics and electronics Co., LTD). The adsorption-indication function layer was prepared according to the method of the present invention by using a plastic thin film coated with a transparent self adhesive (PET gum transparent piece PF04, Shanghai Humai composite materials Co., LTD) as the substrate material layer and the adsorption material layer of the adsorption-indication function layer, using a white paper of 60 g/cm² as the isolation layer, using a commercially available release film, and using a self adhesive paper as the material of the indication function layer. The thermosensitive function layer and the adsorption-indication function layer of the label were combined with each other by sealing and attaching tightly, and the sealed sample was kept at a constant temperature of 25° C. After standing for a certain time, the colour of the thermosensitive label was observed and recorded. FIG. 3 shows the colour record of the thermosensitive label which has been kept at a constant temperature of 25° C. for 0-10 hours, wherein the colour of the adsorption-indication function layer became darker as the storage time extended.

Example 2

Figure 4:
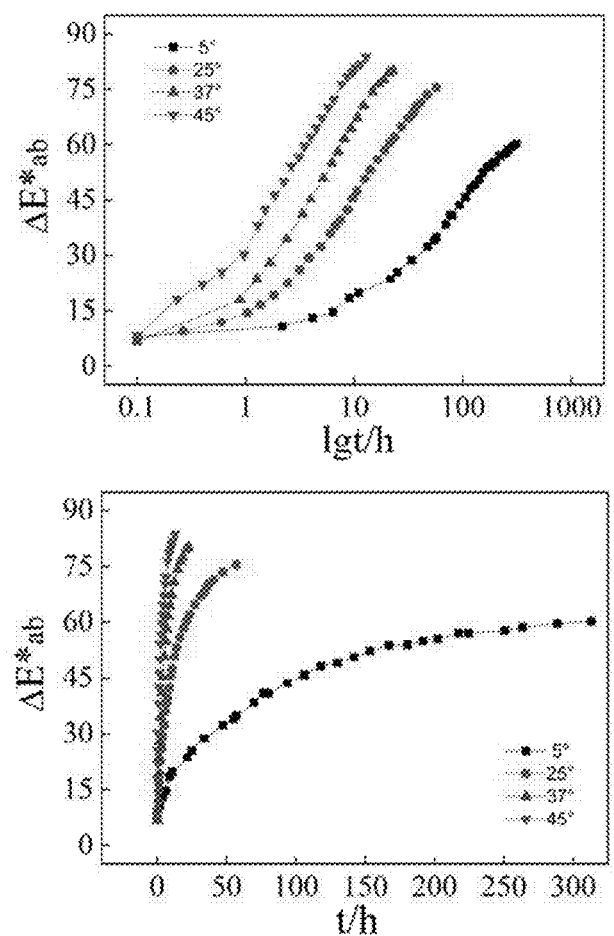
FIG. 4 shows the change in colour difference $\Delta E^*_{ab}$ of the thermosensitive label, which is prepared by using guaiazulene as the thermosensitive function material in example 2 of the present invention, as a function of storage time t when the thermosensitive label is stored at different temperatures.
Figure 5:
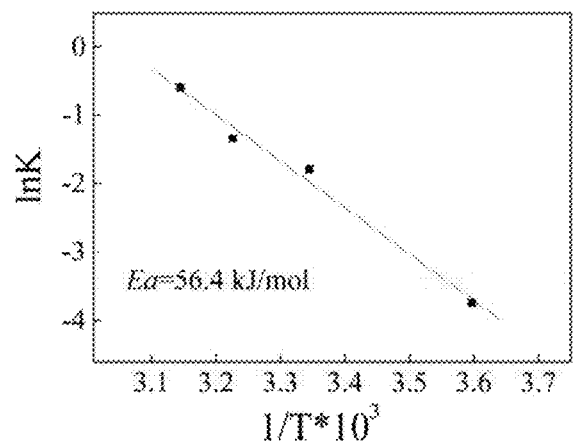
FIG. 5 shows the activation energy of the colour change process of the thermosensitive label, which is prepared by using guaiazulene as the thermosensitive function material in example 2 of the present invention, calculated with the colour difference $\Delta E^*_{ab}=40$ as the end point of the colour change.

FIG. 4 shows the changes in colour difference $\Delta E^*_{ab}$ as a function of time t at different temperatures obtained by storing the thermosensitive label produced in example 1 at 45° C., 37° C., 25° C. and 5° C., and recording colour difference in the observation window regularly with a colorimeter (Colorlite Sph860). The starting colour difference was $\Delta E^*_{ab}$=4-5. By selecting proper end point colour difference, the time and rate of the colour change of the thermosensitive label were obtained. For example, when the end point colour difference was $\Delta E^*_{ab}$=40, the time for reaching the end point was 1.5, 3, 8, 77 hours at 45° C., 37° C., 25° C. and 5° C. respectively. The activation energy of the change process thereof then was deduced with Arrhenius equation, and was about 56.4 kJ/mol (FIG. 5), thereby obtaining the characterization parameters of the temperature effect during the colour change process of the thermosensitive label.

Example 3

Figure 6:
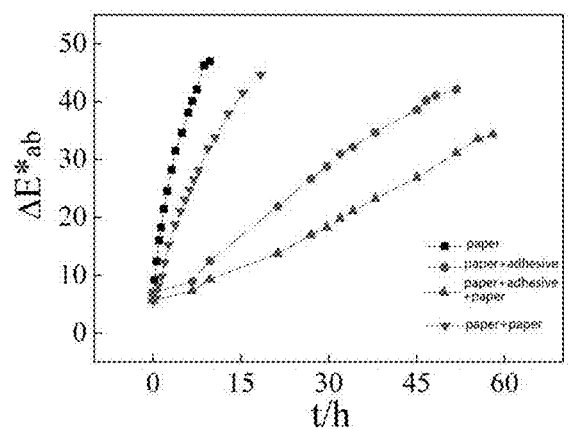
FIG. 6 shows the change in colour difference $\Delta E^*_{ab}$ of the thermosensitive label, which is prepared by using guaiazulene as the thermosensitive function material and modifying the material and structure of the isolation layer in example 3 of the present invention, as a function of storage time t obtained at a constant temperature of 25° C.

The thermosensitive labels of the present invention were produced in a way similar to example 1, with an exception that the material of the isolation layer and the structure thereof were modified to regulate the colour change rate of the thermosensitive label at different disposal temperatures. In particular, the thermosensitive labels were prepared according to the method of example 1 by using guaiazulene as the thermosensitive material of the thermosensitive label, and using white paper of 60 g/cm² (paper), two-layer paper of 60 g/cm² (paper+paper), one-layer white paper of 60 g/cm² coated with a certain amount of self adhesive (paper+adhesive), or two-layer white paper of 60 g/cm² coated therebetween with a certain amount of self adhesive (paper+adhesive+paper) respectively as the isolation layer. The thermosensitive function layer and the adsorption-indication function layer of the label were combined with each other by sealing and attaching tightly, and the sealed sample was kept at a constant temperature of 25° C. The colour difference in the observation window was recorded regularly with a colorimeter, and the obtained changes in colour difference $\Delta E^*_{ab}$ as a function of time t was shown in FIG. 6: for the thermosensitive labels using different isolation layers, the times for reaching a specific end point were different.

Example 4

Figure 7:
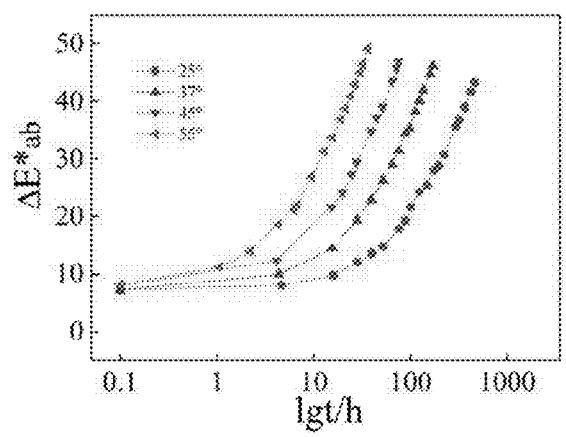
FIG. 7 shows the change in colour difference $\Delta E^*_{ab}$ of the thermosensitive label, which is prepared by using R1=COOCH$_3$-substituted guaiazulene derivative as the thermosensitive function material in example 4 of the present invention, as a function of storage time t obtained at a constant temperature of 25° C.
Figure 8:
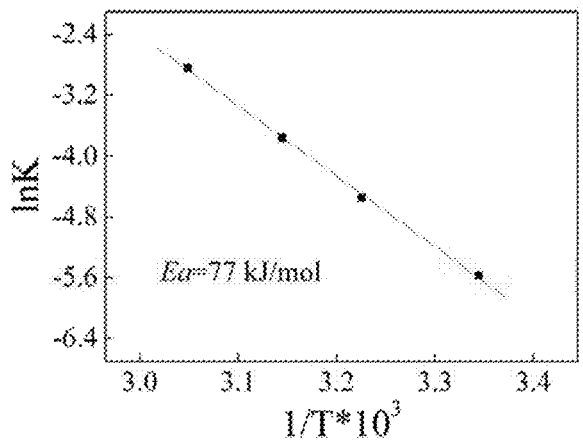
FIG. 8 shows the activation energy of the colour change process of the thermosensitive label, which is prepared by using R1=COOCH$_3$-substituted guaiazulene derivative as the thermosensitive function material in example 4 of the present invention, calculated with the colour difference $\Delta E^*_{ab}=40$ as the end point of the colour change.

The thermosensitive label of the present invention was produced in a way similar to example 1, with an exception that different thermosensitive material or the combination thereof was used to regulate the colour change rate of the thermosensitive label and the activation energy thereof at different disposal temperatures. FIG. 7 showed the changes in colour difference $\Delta E^*_{ab}$ as a function of time t at different temperatures obtained by the following steps: producing the thermosensitive label according to the method of example 1 by choosing guaiazulene derivative substituted with R1=COOCH₃ as the thermosensitive function material, combining the thermosensitive function layer of the label with the adsorption-indication function layer of the label by sealing and attaching tightly, storing at 55° C., 45° C., 37° C. and 25° C., and recording colour difference in the observation window regularly with a colorimeter. The start colour difference of the label was $\Delta E^*_{ab}$=4-5. By selecting proper end point colour difference, the time and rate of the colour change of the thermosensitive label was obtained. For example, when the end point colour difference was set as $\Delta E^*_{ab}$=40, the time for reaching the end point was 27, 65, 136, 421 hours at 55° C., 45° C., 37° C., and 25° C. respectively. Thus, the activation energy of the change process thereof was deduced with Arrhenius equation, and was about 77.0 kJ/mol (FIG. 8), thereby obtaining the characterization parameters of the temperature effect during the colour change process of the thermosensitive label. It can be seen that, both of the response time and the activation energy of the thermosensitive label prepared with R1=COOCH₃-substituted guaiazulene derivative were different from those of the thermosensitive label prepared with guaiazulene.

Example 5

Figure 9:
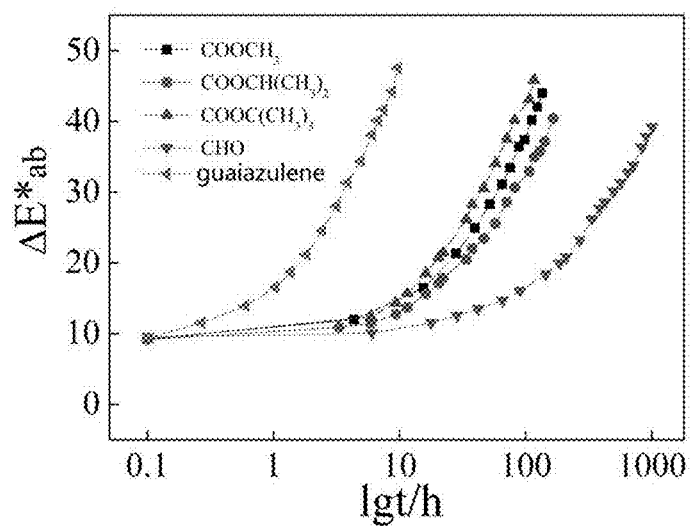
FIG. 9 shows the change in colour difference of the thermosensitive label, which is prepared by using guaiazulene or guaiazulene derivative substituted with R1=COOCH$_3$, COOCH(CH$_3$)$_2$, COOC(CH$_3$)$_3$, or CHO as the thermosensitive function material in example 5 of the present invention, as a function of time when the thermosensitive label is stored at 37° C.

The thermosensitive labels were produced in a way similar to example 1 using guaiazulene and guaiazulene derivatives substituted with R1=COOCH₃, COOCH(CH₃)₂, COOC(CH₃)₃ and CHO respectively as the thermosensitive function material. From the changes in colour difference as a function of time when stored at 37° C. (FIG. 9), it can be seen that, for the labels with different thermosensitive materials, the times for reaching the same end point colour difference are different.

Example 6

Figure 10:
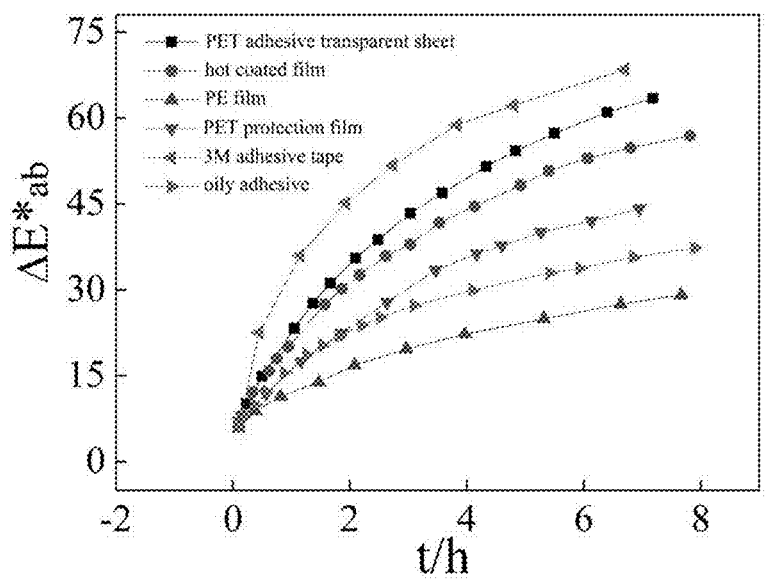
FIG. 10 shows the change in colour difference $\Delta E^*_{ab}$ of the thermosensitive label, which is prepared by using guaiazulene as the thermosensitive function material and choosing five different adsorption materials in example 6 of the present invention, as a function of storage time t under the same temperature environment.

The thermosensitive functional labels of the present invention were produced in a way similar to example 1, with an exception that different adsorption materials were used to regulate the colour change rate of the thermosensitive label and the activation energy thereof. FIG. 10 showed a method with reference to the method of example 1. The thermosensitive labels were produced using guaiazulene as the thermosensitive function material and using five different adsorption materials respectively. The change rates of the colour difference of the adsorption-indication function layer of the thermosensitive label as a function of time at the same ambient temperature were significantly different from each other.

The above exemplary description and exemplary examples will not limit the protection scope of the present invention. Any technical solutions formed by identical alternation or equivalent substitution, or any thermosensitive label prepared with different process or formulation according to the technical solution or concept of the present invention falls in the protection scope of the present invention.

What claimed is:

1. A thermosensitive label for monitoring the quality state of a thermosensitive article, comprising two laminated portions of a thermosensitive function layer and an adsorption-indication function layer, which are physically independent of each other before use, wherein the thermosensitive function layer comprises:

a sealing film;

a first substrate material layer on the sealing film, wherein the first substrate material layer is made of white paper, copy paper, or printing paper;

a volatile dye layer formed on the first substrate material layer, wherein the difference between an activation energy of a volatilization process of the volatile dye layer and that of a quality deterioration process of the thermosensitive article is within a predetermined range, and wherein the volatile dye layer is formed by coating or impregnating the first substrate material layer with a volatile dye; and a first release film layer, which covers the volatile dye layer, wherein the sealing film and the first release film layer are larger than the volatile dye layer in dimension, and the volatile dye layer is sealed between the sealing film and the first release film layer, and the adsorption-indication function layer comprises:

a second substrate material layer, which is made of transparent material;

a reference indication layer, which is located above the second substrate material layer and has an observation window around which a reference colour is present;

an adsorption material layer, which is located under the second substrate material layer and is able to adsorb a volatile dye from the volatile dye layer, wherein the adsorption material layer is overlapped or aligned with the observation window in a vertical direction;

an isolation layer made of opaque material and located under the adsorption material layer, wherein the isolation layer is larger than the observation window in dimension, and larger than or equal to the volatile dye layer in dimension and the volatile dye is able to diffuse through the isolation layer; and a second release film layer, which covers the isolation layer.

2. The thermosensitive label of claim 1, wherein, the adsorption material layer per se is made of a transparent self adhesive.

3. The thermosensitive label of claim 1, wherein, in use, the first release film layer and the second release film layer are peeled off, the isolation layer of the adsorption-indication function layer is aligned with the volatile dye layer of the thermosensitive function layer, and the isolation layer and the volatile dye layer are sealed between the sealing film and the second substrate material layer, obtaining a sealed laminate of the adsorption-indication function layer and the thermosensitive function layer; and then the sealing film is adhered to the thermosensitive article;

or, the sealing film is adhered to the thermosensitive article, then the first release film layer and the second release film layer are peeled off, the isolation layer of the adsorption-indication function layer is aligned with the volatile dye layer of the thermosensitive function layer, and the isolation layer and the volatile dye layer are sealed between the sealing film and the second substrate material layer, obtaining a sealed laminate of the adsorption-indication function layer and the thermosensitive function layer;

wherein the sealed laminate of the adsorption-indication function layer and the thermosensitive function layer comprises:

the sealing film;

the first substrate material layer on the sealing film;

the volatile dye layer formed on the first substrate material layer;

the second substrate material layer;

the reference indication layer located above the second substrate material layer;

the adsorption material layer located under the second substrate material layer; and the isolation layer located under the adsorption material layer.

4. The thermosensitive label of claim 3, wherein the sealing film is coated with a self adhesive at a bottom face and the self adhesive is covered by a third release film;

in use, the third release film is peeled off, and then the sealing film is adhered to the thermosensitive article with the self adhesive on the bottom face of the sealing film.

5. The thermosensitive label of claim 3, wherein, a colour depth of the reference colour around the observation window of the reference indication layer is the same as a colour depth of the adsorption material layer which adsorbs a dye volatilized from the volatile dye layer after the volatile dye layer has been subjected to a same process as the one in which the thermosensitive article fails.

6. The thermosensitive label of claim 1, wherein the isolation layer acts as a diffusion path for a dye diffusing from the thermosensitive function layer to the adsorption material layer after volatilization, and regulates the diffusion rate of the volatile dye; the isolation layer is made of white opaque material.

7. The thermosensitive label of claim 1, wherein, an adsorption material irreversibly adsorbs a dye volatilized from the volatile dye layer, and an adsorption rate at which the adsorption material adsorbs the volatile dye is much higher than a volatilization rate of the volatile dye.

8. The thermosensitive label of claim 1, wherein, the thermosensitive article is selected from dairy products, vaccines, biological products, bio-active samples, medicines, foods or drinks.

9. The thermosensitive label of claim 1, wherein, the activation energy of the volatilization process of the volatile dye layer is 60-100 kJ/mol, and the difference between the activation energy of the volatilization process of the volatile dye layer and that of the quality deterioration process of the thermosensitive article is within a range of ±10 kJ/mol.

10. The thermosensitive label of claim 1, wherein, the volatile dye in the volatile dye layer is at least one selected from azo dyes, anthraquinone dyes, compounds of formula I and the derivatives thereof, or the combination thereof, wherein the compounds of formula I have the following general formula:

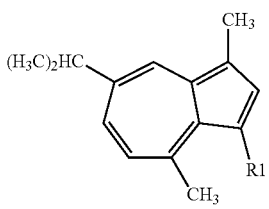

wherein,

R1 is selected from hydrogen, halogen, linear or branched $C_{1-6}$ alkyl, linear or branched $C_{1-6}$ alkoxy, —COR2 and —COOR2; and R2 is selected from hydrogen, linear or branched $C_{1-6}$ alkyl, and linear or branched $C_{1-6}$ alkylamino.

11. The thermosensitive label of claim 1, wherein, the volatile dye layer further comprises one or more volatilization auxiliaries, wherein the volatilization auxiliary is one or more selected from the following volatile compounds:

hexane, heptane, octane or the isomers thereof, cyclohexane, cycloheptane, cyclopentane, naphthalene, and anthracene;

erythritol, lauryl alcohol, tridecanol, tetradecanol, pentadecanol, hexadecanol, heptadecanol, and stearyl alcohol;

maleic acid, fumaric acid, lauric acid, tridecanoic acid, myristic acid, pentadecanoic acid, palmitic acid, adipic acid, sebacic acid, and dodecanedioic acid;

aminobenzoic acid, leucine, and phenylalanine;

ethyl acetate;

diphenyl sulfone, diphenyl disulfone, dibenzyl sulfone, and dibutyl; and naphthalene and camphor.

12. A thermosensitive article using the thermosensitive label of claim 3.

13. A method for preparing the thermosensitive label for monitoring the quality state of a thermosensitive article according to claim 1, comprising the following steps:

providing the sealing film;

providing the first substrate material layer made of white paper, copy paper, or printing paper, on the sealing film;

forming the volatile dye layer on the first substrate material layer by coating or impregnating the first substrate material layer with the volatile dye, wherein the difference between the activation energy of the volatilization process of the volatile dye layer and that of the quality deterioration process of the thermosensitive article is within a predetermined range;

covering the volatile dye layer with the first release film layer, wherein the sealing film and the first release film layer are larger than the volatile dye layer in dimension, and the volatile dye layer is sealed between the sealing film and the first release film layer, thereby forming the thermosensitive function layer;

and providing the second substrate material layer made of a transparent material;

forming the reference indication layer on the second substrate material layer, wherein the reference indication layer has an observation window around which a reference colour is present;

forming the adsorption material layer under the second substrate material layer, wherein the adsorption material layer adsorbs the dye in the volatile dye layer, the absorption material layer being overlapped or aligned with the observation window in the vertical direction;

forming the isolation layer with an opaque material under the adsorption layer, wherein the isolation layer is larger than the observation window in dimension, and larger than or equal to the volatile dye layer in dimension, and the volatile dye is able to diffuse through the isolation layer; and forming the second release film under the isolation layer, so as to form the adsorption-indication function layer.

14. The method of claim 13, further comprising the step of printing a reference colour layer around the observation window after forming the reference indication layer, wherein the reference colour layer is made of a non-volatile dye, and a colour depth thereof is the same as a colour depth of the adsorption material layer which adsorbs the volatile dye from the volatile dye layer after the volatile dye layer has been subjected to a same process as the one in which the thermosensitive article fails.

15. The method of claim 13, wherein, the reference colour around the observation window of the reference indication layer is determined by the following steps:

(1) measuring an initial colour difference (C0) in the observation window, which is the initial colour difference in the observation window without volatilization and adsorption of the dye, with a colorimeter; and (2) keeping the label under a desired disposal condition, recording a colour difference in the observation window regularly, plotting a curve of the colour difference as a function of time, obtaining the colour difference (C1) at a time of a storage valid period of the thermosensitive label, and using the obtained colour of the adsorption material layer observed through the observation window as the reference colour.

\* \* \* \* \*